Aug. 8, 1961 J. F. JOY 2,995,352
MINING APPARATUS HAVING CORE FORMING AND CORE BURSTING MEANS
Filed Jan. 25, 1954 15 Sheets-Sheet 3

INVENTOR:
JOSEPH F. JOY
BY Charles F. Osgood.
ATTORNEY

INVENTOR:
JOSEPH F. JOY
BY Charles F. Osgood,
ATTORNEY

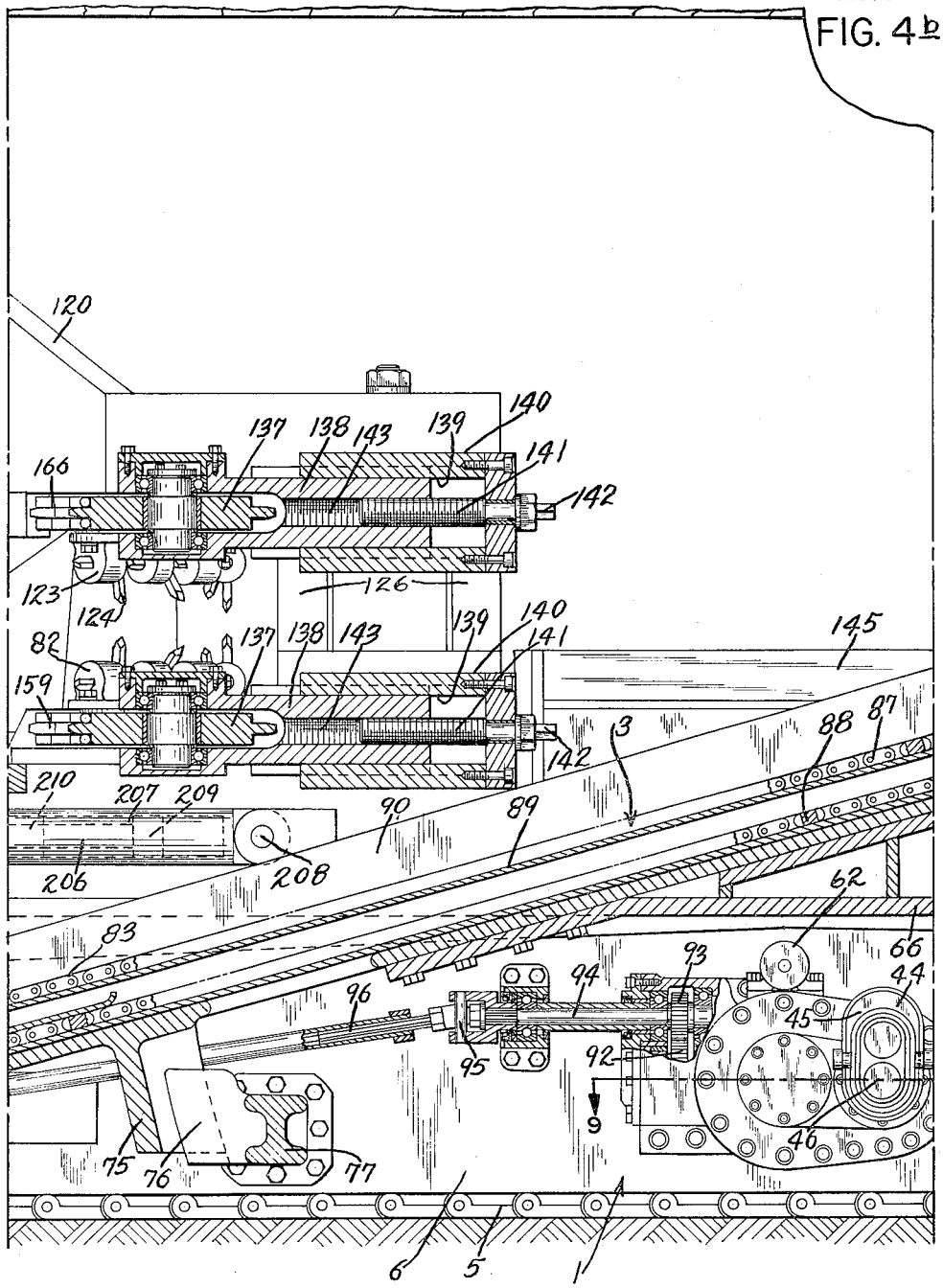

Aug. 8, 1961  J. F. JOY  2,995,352
MINING APPARATUS HAVING CORE FORMING AND CORE BURSTING MEANS
Filed Jan. 25, 1954  15 Sheets-Sheet 6
FIG. 4<u>c</u>.
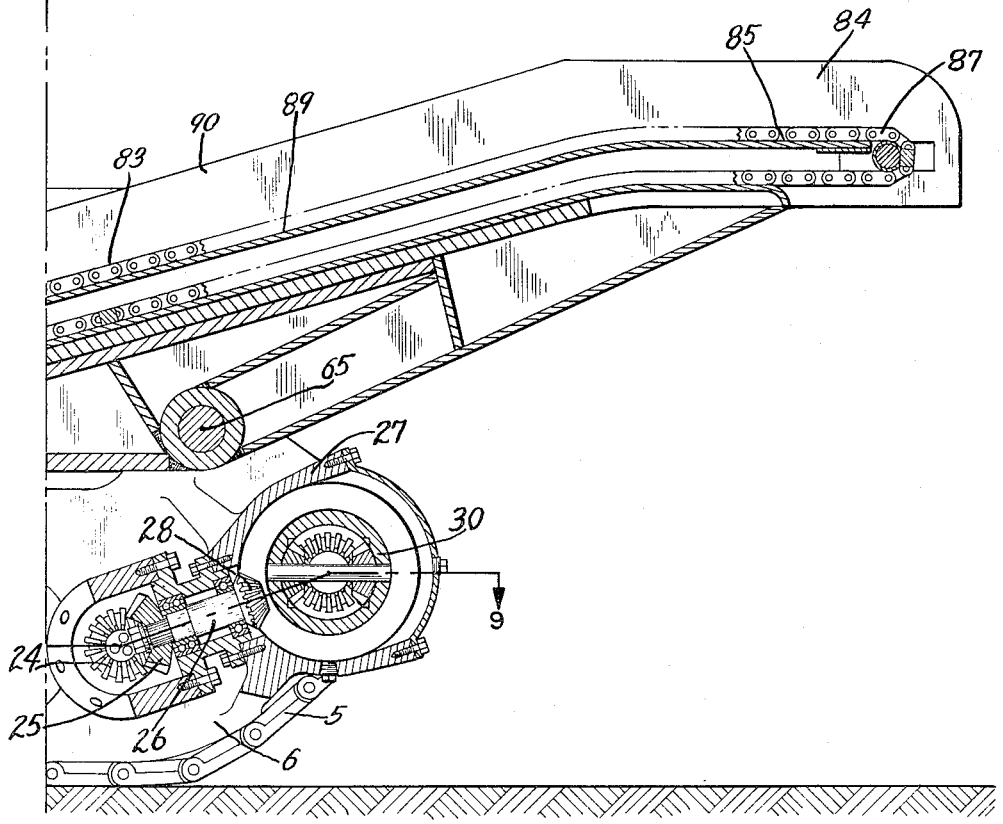
INVENTOR:
JOSEPH F. JOY
BY Charles F. Osgood,
ATTORNEY

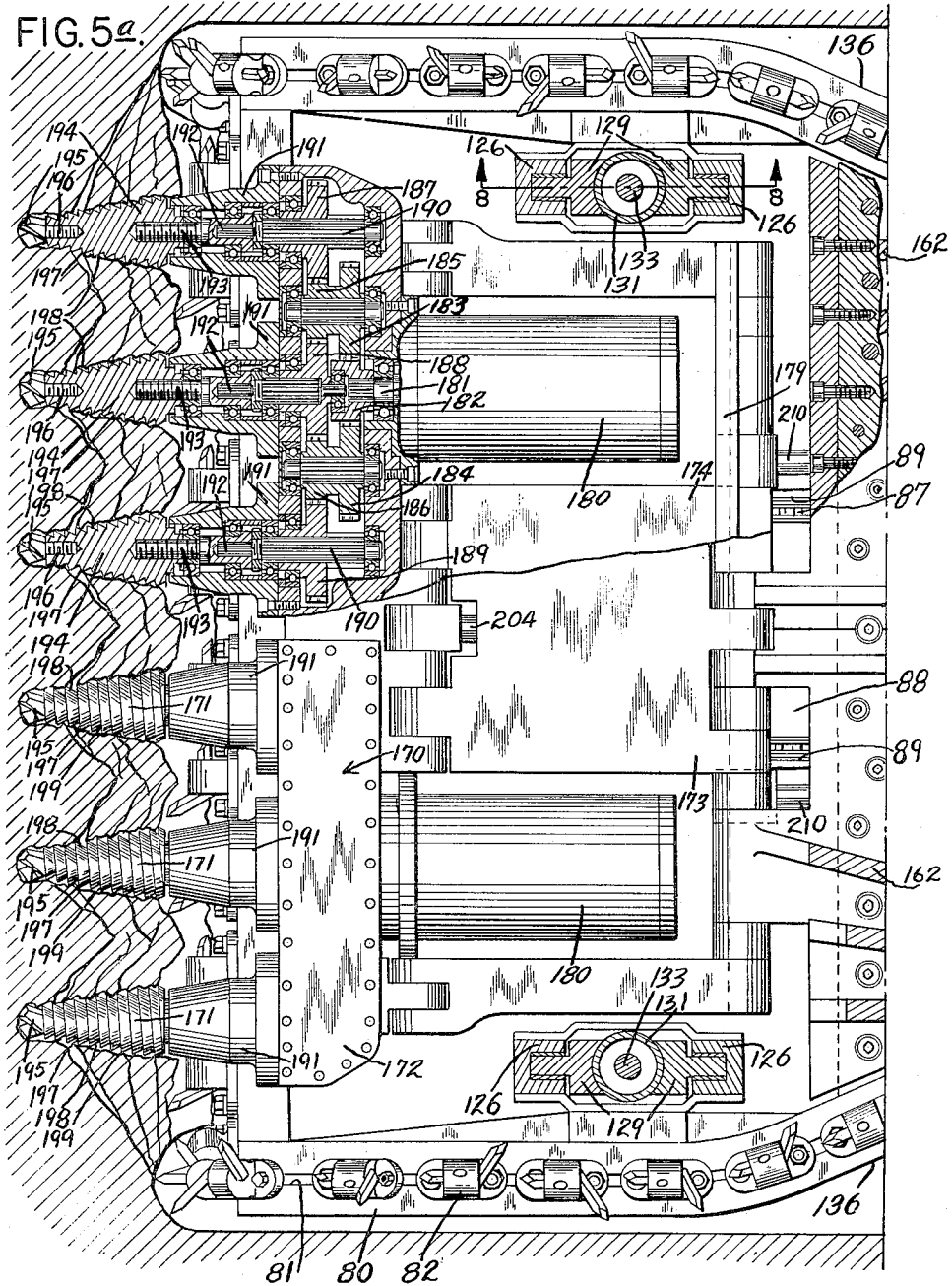

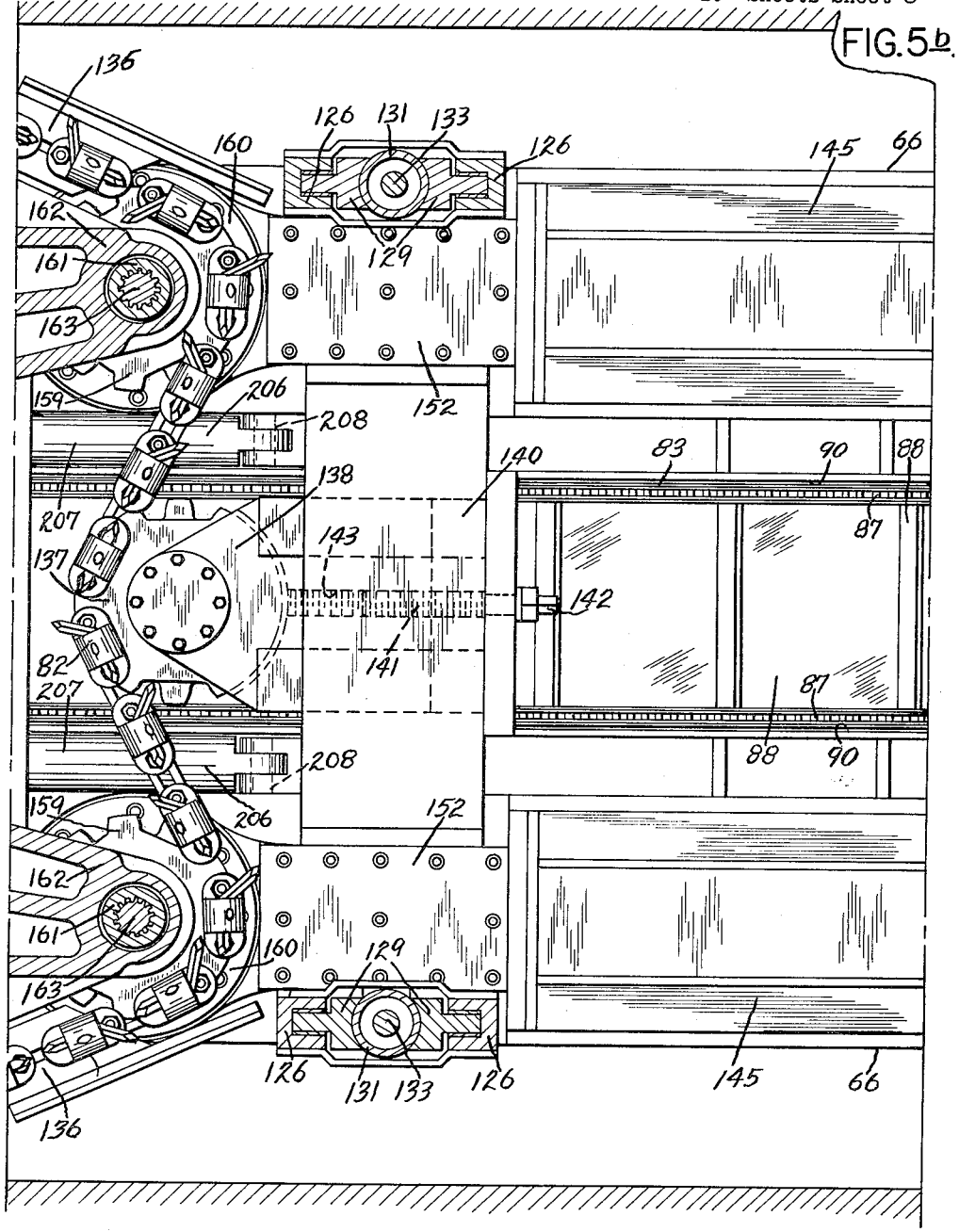

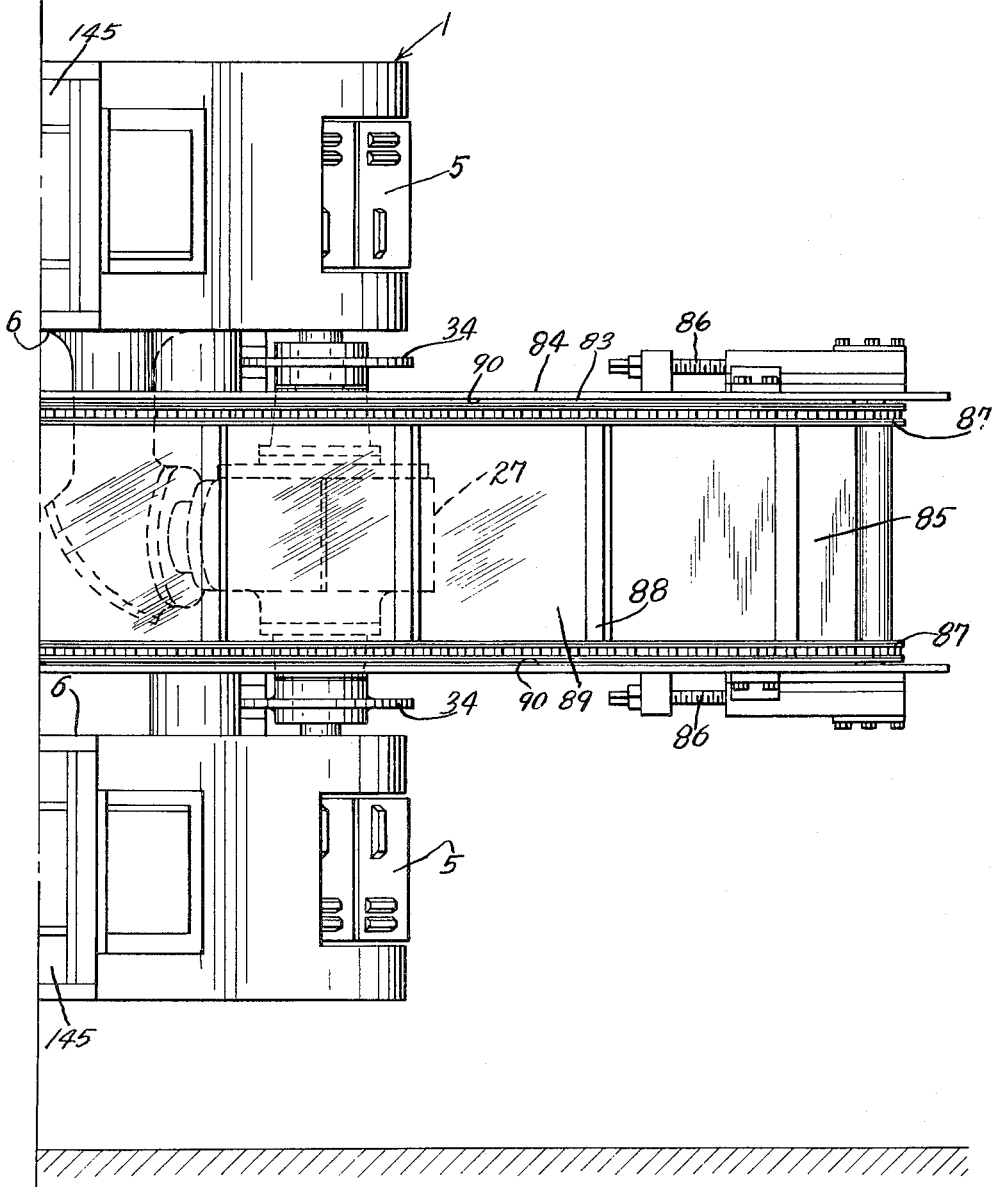

Aug. 8, 1961 J. F. JOY 2,995,352
MINING APPARATUS HAVING CORE FORMING AND CORE BURSTING MEANS
Filed Jan. 25, 1954 15 Sheets-Sheet 10

INVENTOR:
JOSEPH F. JOY
BY Charles F. Osgood,
ATTORNEY

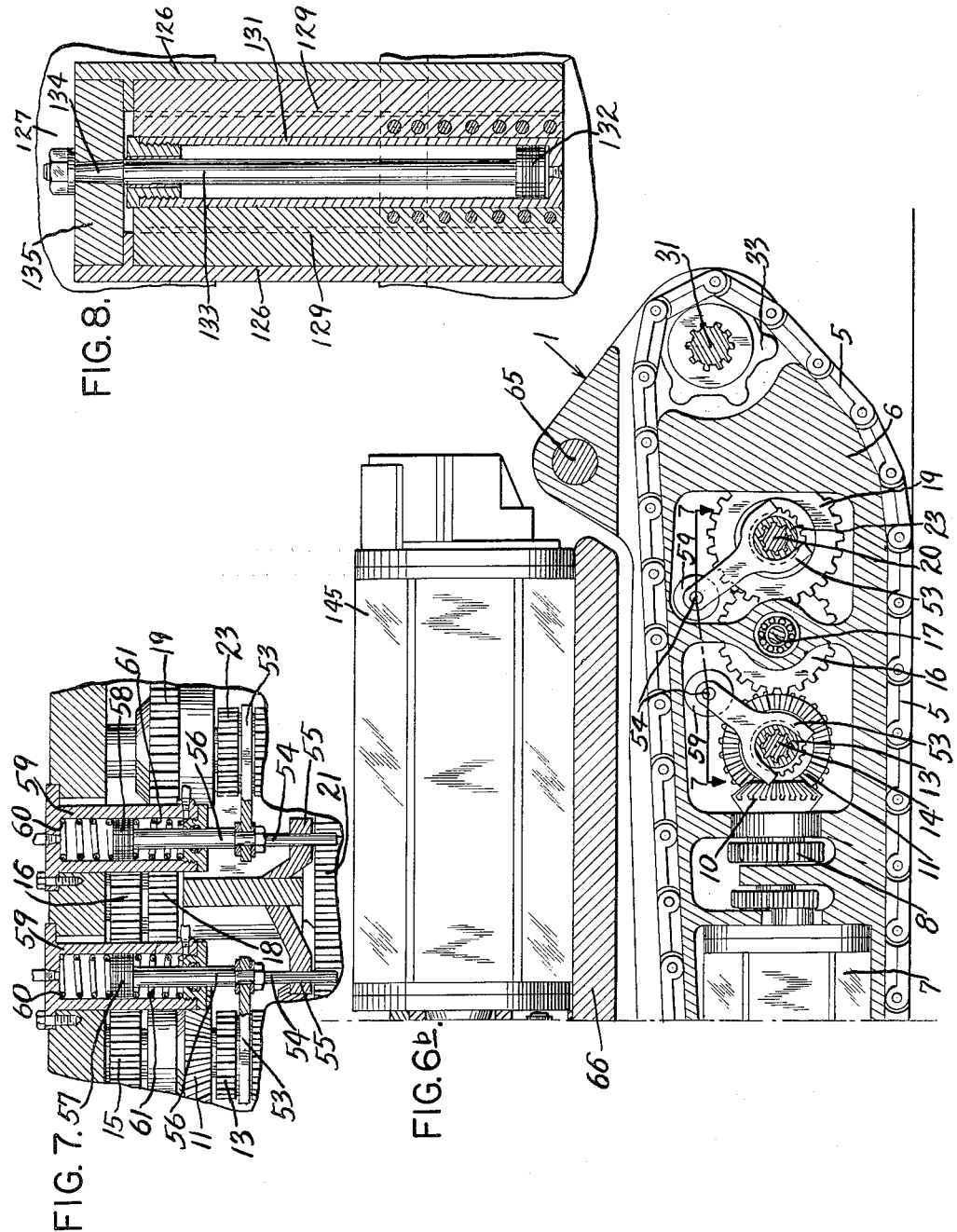

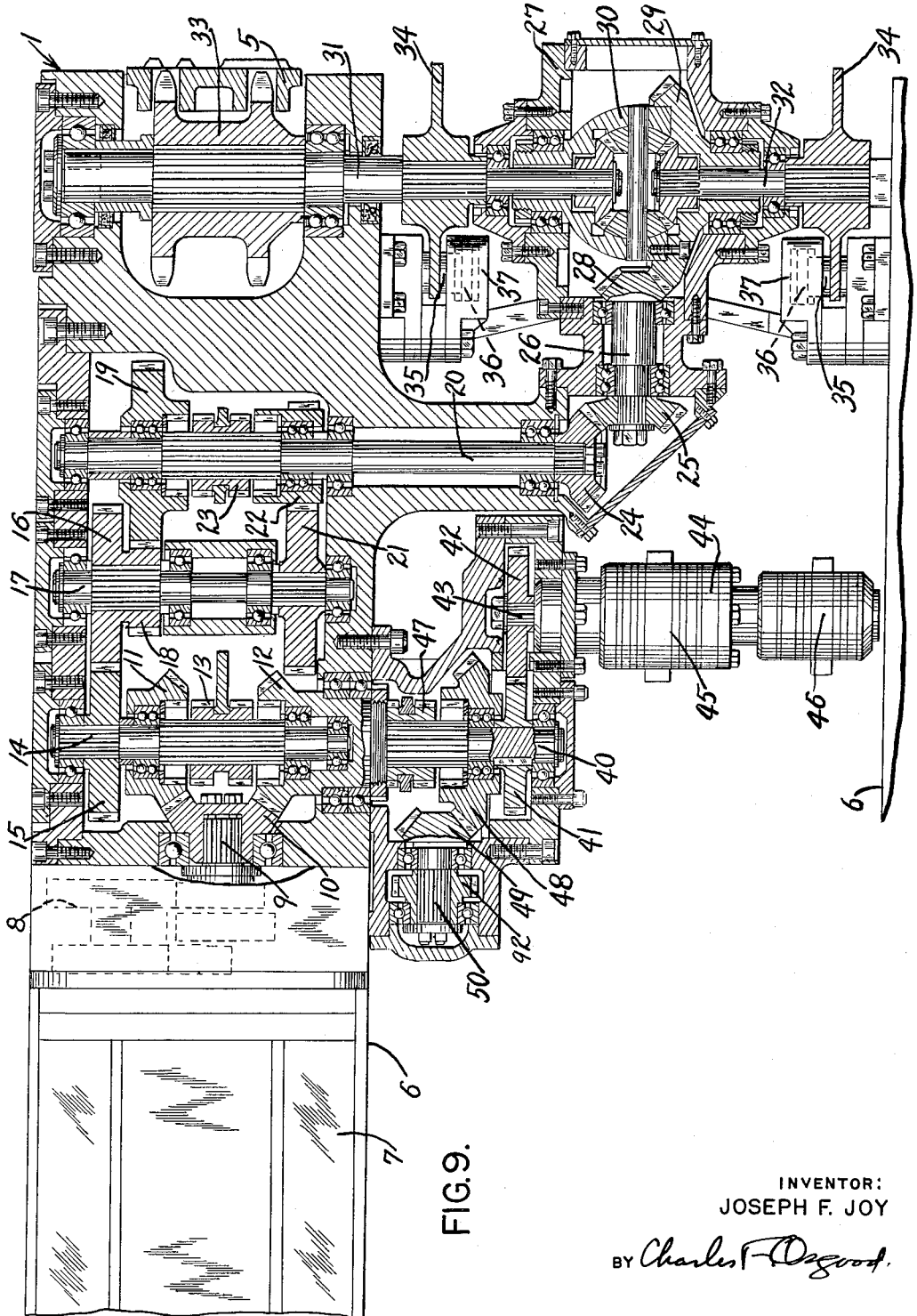

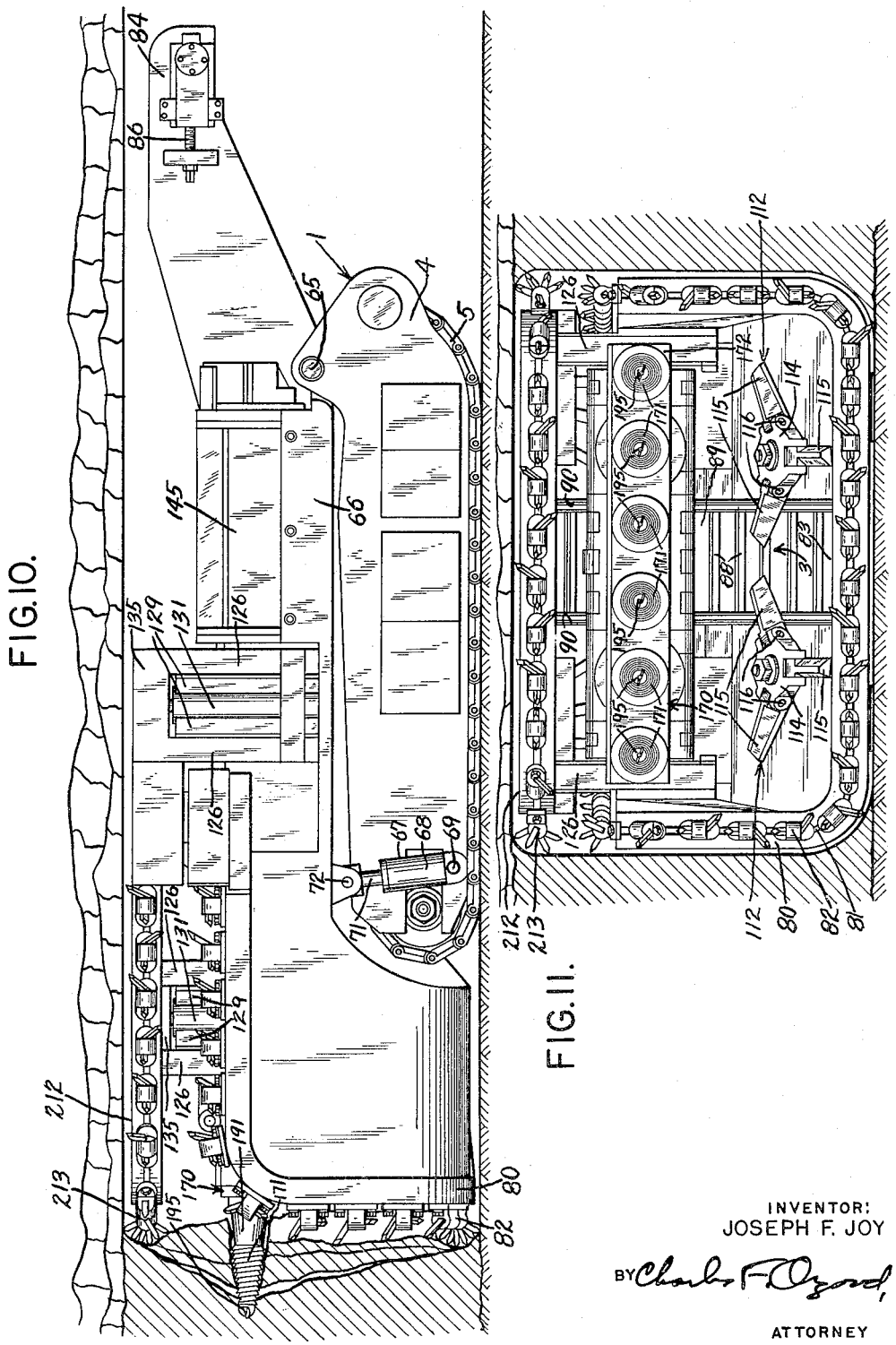

Aug. 8, 1961 J. F. JOY 2,995,352
MINING APPARATUS HAVING CORE FORMING AND CORE BURSTING MEANS
Filed Jan. 25, 1954 15 Sheets-Sheet 14
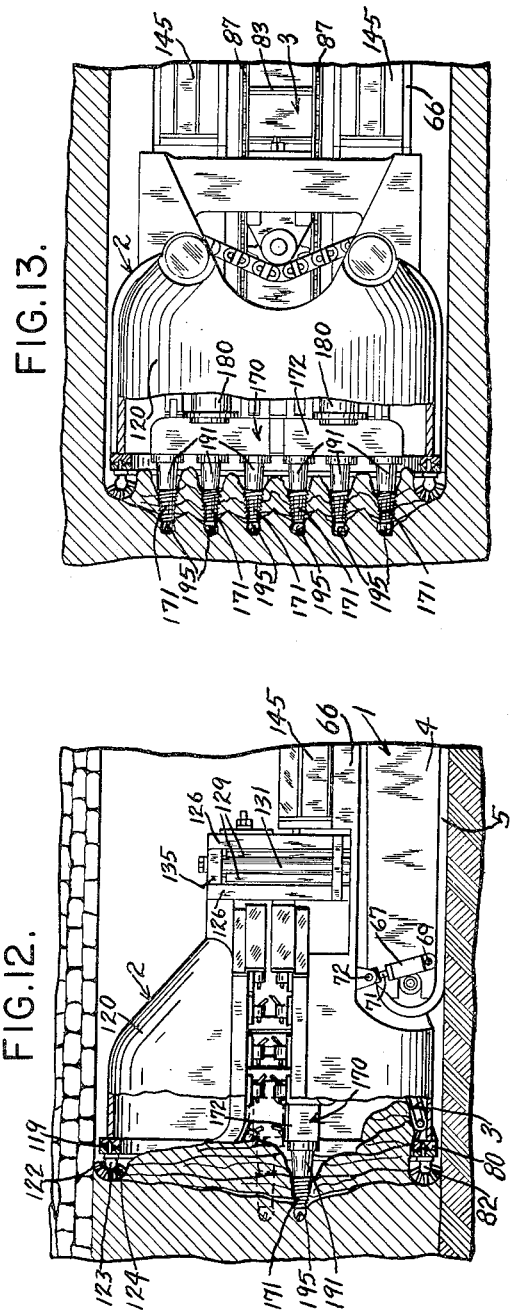
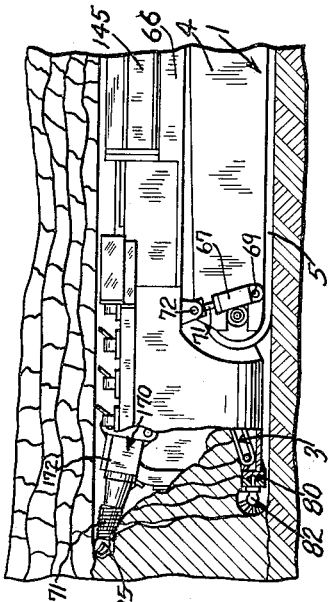
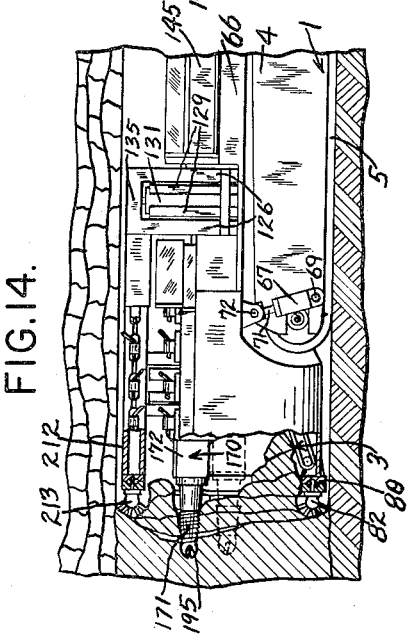
INVENTOR:
JOSEPH F. JOY
BY Charles F. Osgood,
ATTORNEY Aug. 8, 1961     J. F. JOY     2,995,352
MINING APPARATUS HAVING CORE FORMING AND CORE BURSTING MEANS
Filed Jan. 25, 1954     15 Sheets-Sheet 15

INVENTOR:
JOSEPH F. JOY
BY Charles F. Osgood,
ATTORNEY

United States Patent Office 2,995,352
Patented Aug. 8, 1961

2,995,352
MINING APPARATUS HAVING CORE FORMING AND CORE BURSTING MEANS
Joseph F. Joy, Pittsburgh, Pa., assignor to Joy Manufacturing Company, Pittsburgh, Pa., a corporation of Pennsylvania
Filed Jan. 25, 1954, Ser. No. 405,853
5 Claims. (Cl. 262—5)

This invention relates to a mining apparatus and more particularly to a mining and loading apparatus of the type commonly known as a continuous miner for dislodging the mineral from a solid mine vein by a substantially continuous operation thereby eliminating the need for the usual separate steps of cutting, drilling and blasting.

In known types of mining and loading apparatus, the mineral is either ripped or torn from the face of the solid mine vein by means of orbitally movable disintegrating elements disposed in upright parallel orbits or by parallel rows of rotating drilling or rotary core cutting or breaking heads disposed on horizontal axes substantially perpendicular to the working face and which chip away and drill out the mineral as mining progresses. While such types of mining and loading apparatus have been successfully operated in the mining of mineral, it has been found that the mineral is broken up or chipped into relatively small pieces and that the cutters or drill bits must be frequently sharpened or replaced since they tear away or cut substantially all the mineral directly by the direct cutting action of the bits or cutters. Moreover, the rotary drill or coring head types of apparatus lack the desired flexibility and range of adjustment. My copending applications, Serial No. 725,950 filed February 1, 1947, now Patent No. 2,801,093 and Serial No. 194,259 filed November 6, 1950, now Patent No. 2,910,283, disclose mining and loading apparatus which overcome some of the disadvantages of such previous apparatus. The present invention contemplates improvements over my earlier applications above referred to in that the face of the mineral to be dislodged from the solid vein is cut substantially about its boundary to form a core of mineral in an improved and more effective manner and the core of mineral is dislodged and broken up into relatively large pieces or lumps by means of improved mechanical breaker wedge devices which penetrate and apply terrific bursting stresses to the core. By cutting a kerf or slot substantially circumscribing the section of mineral to be dislodged and by breaking off the mineral-section in large fragments by the mechanical blasting devices, the cutting function by a direct cutting action is reduced to a minimum thereby substantially reducing the need for frequent resharpening and replacement of cutters or bits, thus substantially reducing the cost and increasing the speed of production.

An object of the present invention is to provide an improved mining apparatus. Another object is to provide an improved mining and loading apparatus of the type known as a continuous miner having improved mechanical means for dislodging the mineral from a solid mine vein. A further object is to provide an improved cutting and dislodging head for a continuous miner whereby a kerf is formed in the mine vein along a closed path circumscribing the section of mineral to be dislodged and having improved mechanical burster means penetrating the mineral-section for applying powerful dislodging pressures thereto to break down the mineral in relatively large fragments or lumps. Yet another object is to provide an improved continuous miner of the U-bar type for cutting kerfs at either or both the floor and roof levels and at the sides to form a large core of mineral which is substantially free at its margin or boundaries. Another object is to provide a cutting and dislodging head for a continuous miner embodying a U-bar cutter and an inverted top U-bar cutter with the cutters cooperating to cut out a large core of mineral from a solid mine vein between the floor and roof of a mine. A still further object is to provide a U-bar cutter head for cutting out a core of mineral and having improved mechanical breaker wedge means for applying powerful dislodging pressures to the mineral core for dislodging the latter. Still another object is to provide an improved cutting and dislodging head for a continuous miner which may be adjusted to accommodate itself to mine veins of varying heights and may be tilted to accommodate itself to an uneven floor or rolling bottom. A still further object is to provide an improved cutting and dislodging head for a continuous miner for forming a passageway or entry in a mine vein of generally rectangular shape in cross section to provide a plane floor and roof and parallel vertical plane sides. Another object is to provide an improved mechanical breaker or burster mechanism provided with an improved adjustable mounting structure. These and other objects and advantages of the invention will, however, hereinafter more fully appear.

In the accompanying drawings there are shown for purposes of illustration two forms and a modification which the invention may assume in practice.

Figure 2:
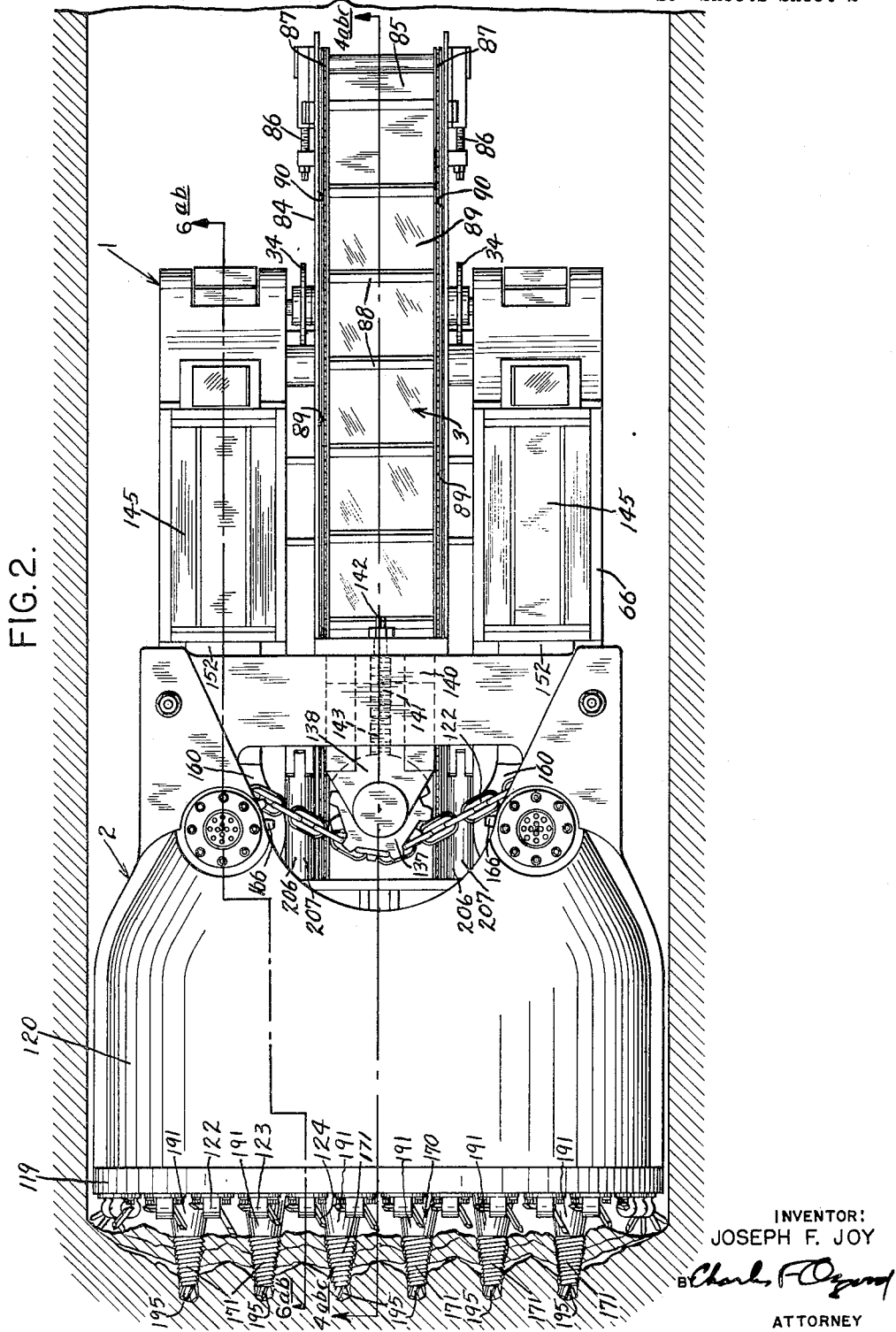
FIG. 2 is a plan view of the apparatus shown in FIG. 1.

FIGS. $4^a$, $4^b$ and $4^c$, taken together, constitute an enlarged central vertical longitudinal section through the apparatus, taken on line $4^{abc}$—$4^{abc}$ of FIG. 2.

Figure 1:
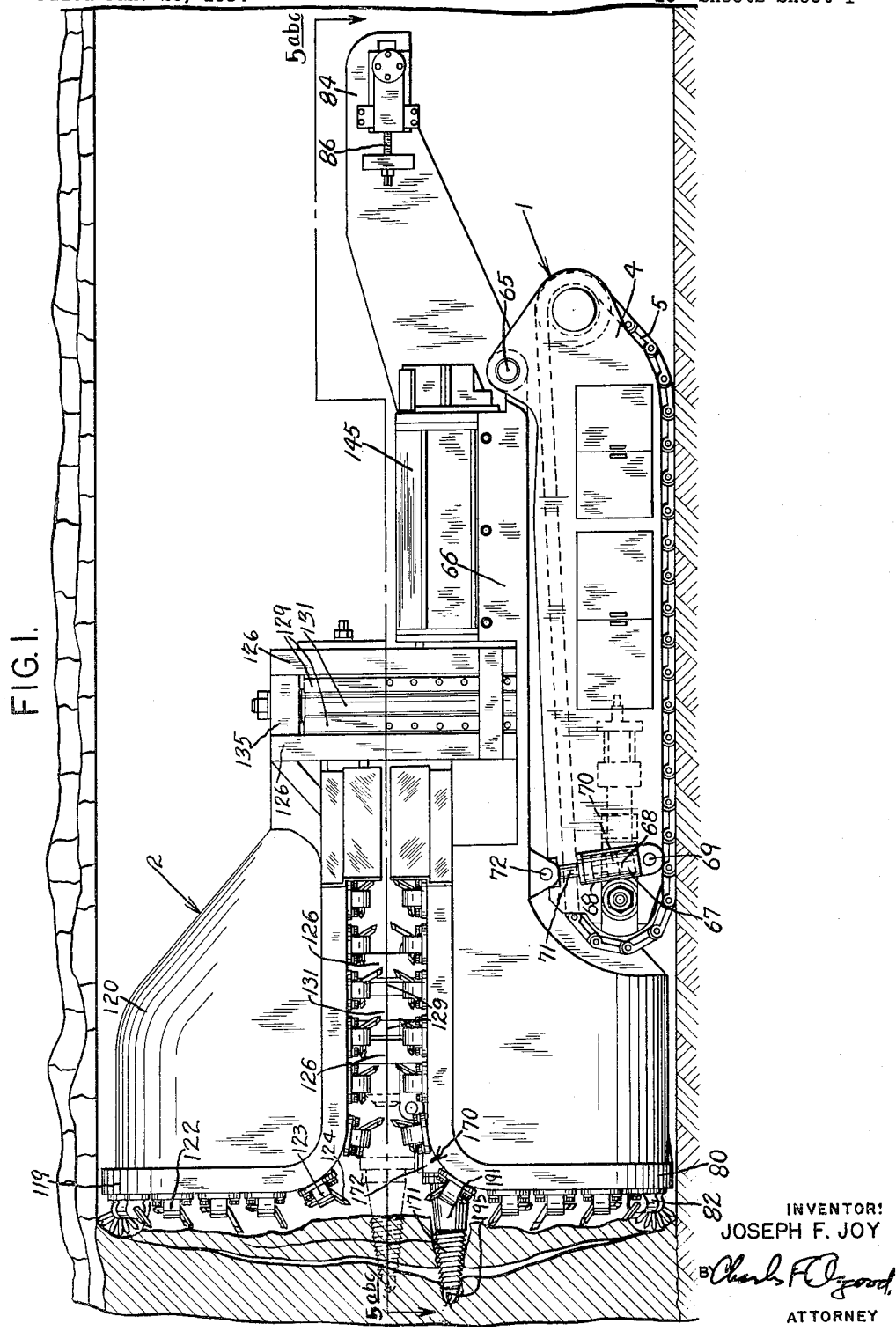
FIG. 1 is a side elevational view of a mining and loading apparatus constructed in accordance with a preferred illustrative embodiment of the invention.

FIGS. $5^a$, $5^b$ and $5^c$, taken together, constitute a horizontal section through the apparatus, taken on line $5^{abc}$—$5^{abc}$ of FIG. 1.

FIGS. $6^a$ and $6^b$, taken together, constitute a longitudinal vertical section through the apparatus, taken on line $6^{ab}$—$6^{ab}$ of FIG. 2.

FIG. 7 is a detailed horizontal section taken on line 7—7 of FIG. $6^b$, showing the hydraulic clutch actuators.

FIG. 8 is a detail vertical section taken on line 8—8 of FIG. $5^a$, showing one of the elevating devices for the upper U-bar cutter.

FIG. 9 is an enlarged section taken on line 9—9 of FIGS. $4^b$ and $4^c$, showing a portion of the transmission gearing.

FIG. 10 is a side elevational view, similar to FIG. 1, showing a mining and loading apparatus having a cutting and dislodging head of a modified construction.

FIG. 11 is a front and elevational view of the apparatus shown in FIG. 10.

FIGS. 12 and 13 are diagrammatic side and plan views respectively, showing the apparatus of the preferred form of the invention in operating position in a mine.

FIG. 14 is a diagrammatic side view showing the apparatus of the modified form of the invention in operating position in a mine.

FIG. 15 is a diagrammatic view, similar to FIG. 14, showing a modified cutting and dislodging head.

Figure 16:
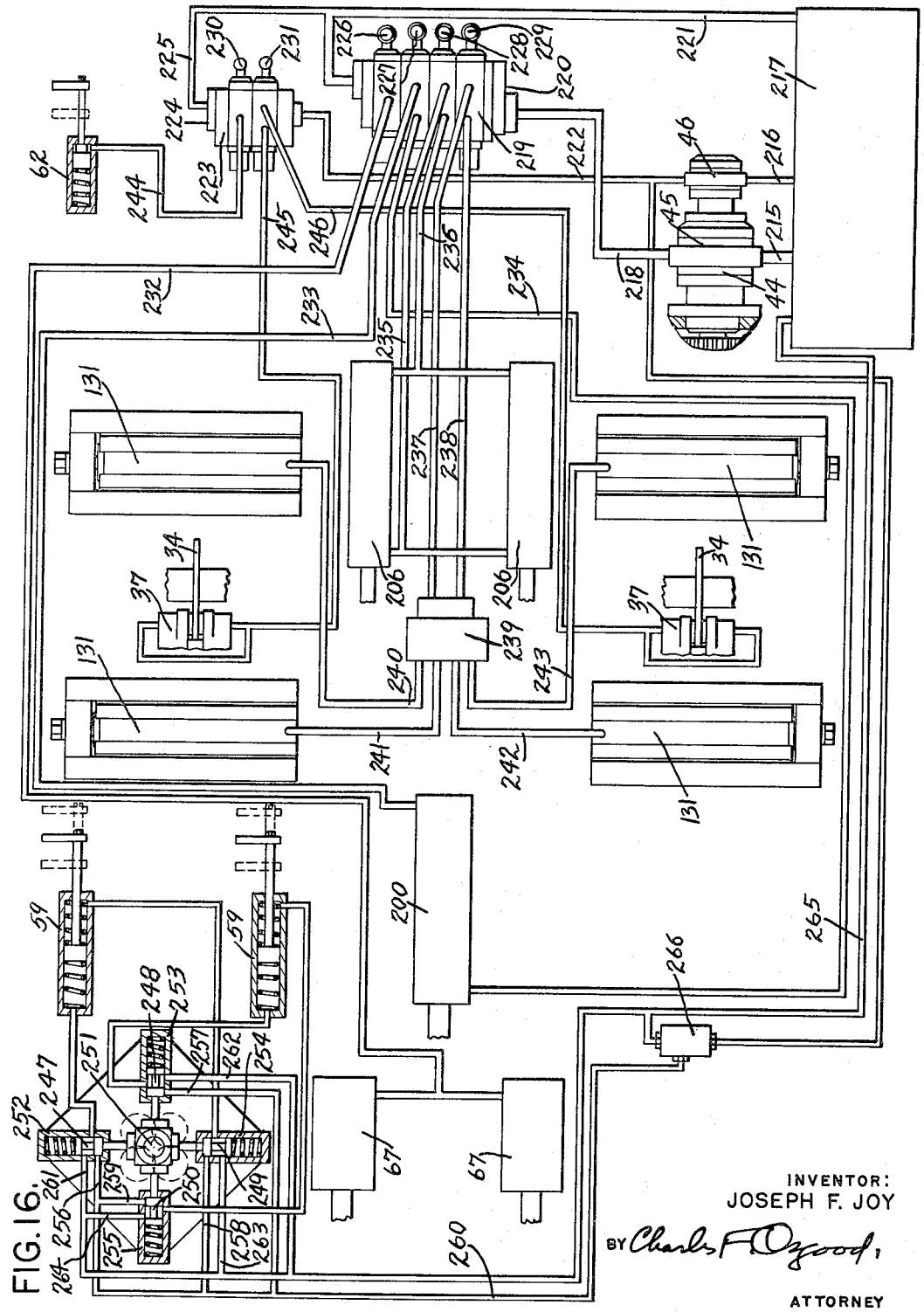

FIG. 16 is a diagrammatic view illustrating the hydraulic fluid system.

In the two forms and modification of the invention the improved mining and loading apparatus or so-called continuous miner generally comprises a mobile base, generally designated 1, on which is adjustably mounted a core cutting and dislodging head, generally designated 2, for cutting and dislodging the mineral of a solid mine vein, and associated with the head is conveyor means, generally designated 3, for receiving the dislodged mineral and for conveying the same rearwardly of the apparatus to a convenient point of delivery. The mobile base serves to propel the apparatus during tramming about the mine and during feeding of the cutting and dislodging head toward the work during the cutting and dislodging operation.

In the embodiment of the invention shown in FIGS. 1 to 9 inclusive, the mobile base 1 is a crawler base and comprises a frame 4 supported by endless crawler treads 5 guided for orbital circulation about side tread frames 6. A horizontal motor 7 carried by one of the side tread frames of the base within the tread-orbit drives through a conventional speed reducer 8 a shaft 9 arranged longitudinally of the tread frame. Secured to this shaft is a bevel gear 10 meshing with oppositely rotating reverse bevels 11 and 12, the latter being alternatively connectible by a conventional sliding gear clutch 13 to a transverse shaft 14. This shaft is suitably journaled within the adjacent tread frame and has a spur gear 15 secured thereto, this gear meshing with and driving a spur gear 16 secured to a parallel transverse shaft 17 likewise suitably journaled within the adjacent tread frame. Integral with the gear 16 is a small spur gear 18 meshing with and driving a large spur gear 19 journaled on a bearing supported by a transverse shaft 20. Secured to the shaft 17 and also driven by the gear 16 is a large spur gear 21 meshing with and driving small spur gear 22. The gearing 18, 19 provides a low speed drive and the gearing 21, 22 provides a high speed drive, and the terminal gears 19 and 22 of these drives are alternatively connectible by a conventional sliding gear clutch 23 to the transverse shaft 20. The shaft 20 is arranged parallel with the shafts 14 and 17 and is likewise journaled within the adjacent tread frame. Thus the shaft 20 may be driven selectively in either of opposite directions at either a slow or a fast speed. Secured to the inner end of the shaft 20 is a bevel gear 24 meshing with and driving a bevel gear 25, the latter being keyed to a longitudinal shaft 26 suitably journaled within a differential housing 27 arranged between and secured to the side tread frames. The shaft 26 has an integral bevel pinion 28 meshing with a bevel gear 29 which drives through conventional differential gearing 30 a pair of coaxial, relatively rotatable, cross shafts 31 and 32. These shafts 31 and 32 are suitably journaled within the tread frames and gear housing 27 and have respectively secured thereto near their remote ends drive sprockets 33 which engage and drive the crawler treads 5. Secured to the aligned shafts 31, 32 are brake disks 34 which are engaged by conventional "spot" type brake shoes 35 hydraulically actuated by plungers 36 contained in cylinders 37 and subjected to hydraulic pressure. Thus the rate of relative rotation of the aligned shafts 31, 32 may be controlled by these brakes 34, 35 to vary the relative speeds of the crawler treads to effect steering of the apparatus, in a well known manner.

Driven by a shaft 40 secured to the hub of the bevel gear 12 is a spur gear 41 which meshes with and drives a spur gear 42 secured to a drive shaft 43 of a dual pump 44 suitably mounted within the base frame. This pump has large and small pump sections 45 and 46 of relatively different capacities. Also driven by the shaft 40 and connectible thereto by a conventional sliding clutch 47 is a bevel gear 48 meshing with and driving a bevel gear 49 secured to a longitudinal shaft 50 suitably journaled within the base frame. The shaft 50 drives the conveyor means 3, as will later be described.

The gear clutches 13 and 23 are hydraulically actuated and each has a shifter yoke 53 connected to an axially movable rod 54 guided in a bracket 55. These rods are formed integral with piston rods 56 of reciprocable pistons 57 and 58 respectively, the latter respectively contained in hydraulic cylinders 59 mounted on the adjacent tread frame. Coil springs 60 and 61 in the cylinders act on opposite sides of the pistons for constantly urging the latter toward their central positions within the cylinders wherein the clutches are disposed in neutral position. By supplying liquid pressure to one end or the other of the cylinders the pistons are moved to effect actuation of the clutches into one position or the other to connect the desired gears 11, 12 and 19, 22 to the shafts driven thereby. By trapping liquid in the cylinders at opposite sides of the pistons the clutches may be maintained in adjusted position. The conveyor drive has a similar hydraulic shifter cylinder 62 for actuating the clutch member 47 (FIG. 4b).

Overlying the crawler base and pivotally mounted at its rear end thereon, at 65, is a tiltable frame or superstructure 66 at the forward end of which the core cutting and dislodging head 2 is carried. The superimposed frame or superstructure extends forwardly down in advance of the crawler treads and projects forwardly in advance of the base, as shown, and a pair of extensible hydraulic jacks 67 are arranged between the forward ends of the tread side frames and the tiltable frame 66 for tilting the latter in vertical planes about its pivot 65 relative to the base. These jacks comprise fluid cylinders 68 pivoted at lower ends, at 69, at the outer sides of the tread side frames, and these cylinders contain reciprocable pistons 70 whose piston rods 71 are pivotally connected at 72 to the sides of the tiltable frame. Liquid trapped in the jack cylinders beneath the pistons serves to hold the tiltable frame in adjusted position. The tiltable frame has depending curved guides 75 (FIG. 4b) which slidingly engage curved guide members 76 secured to a transverse element 77 connected between the tread side frames of the base, and these guides serve to guide the tiltable frame as the latter is rocked about its pivot.

Figure 4A:
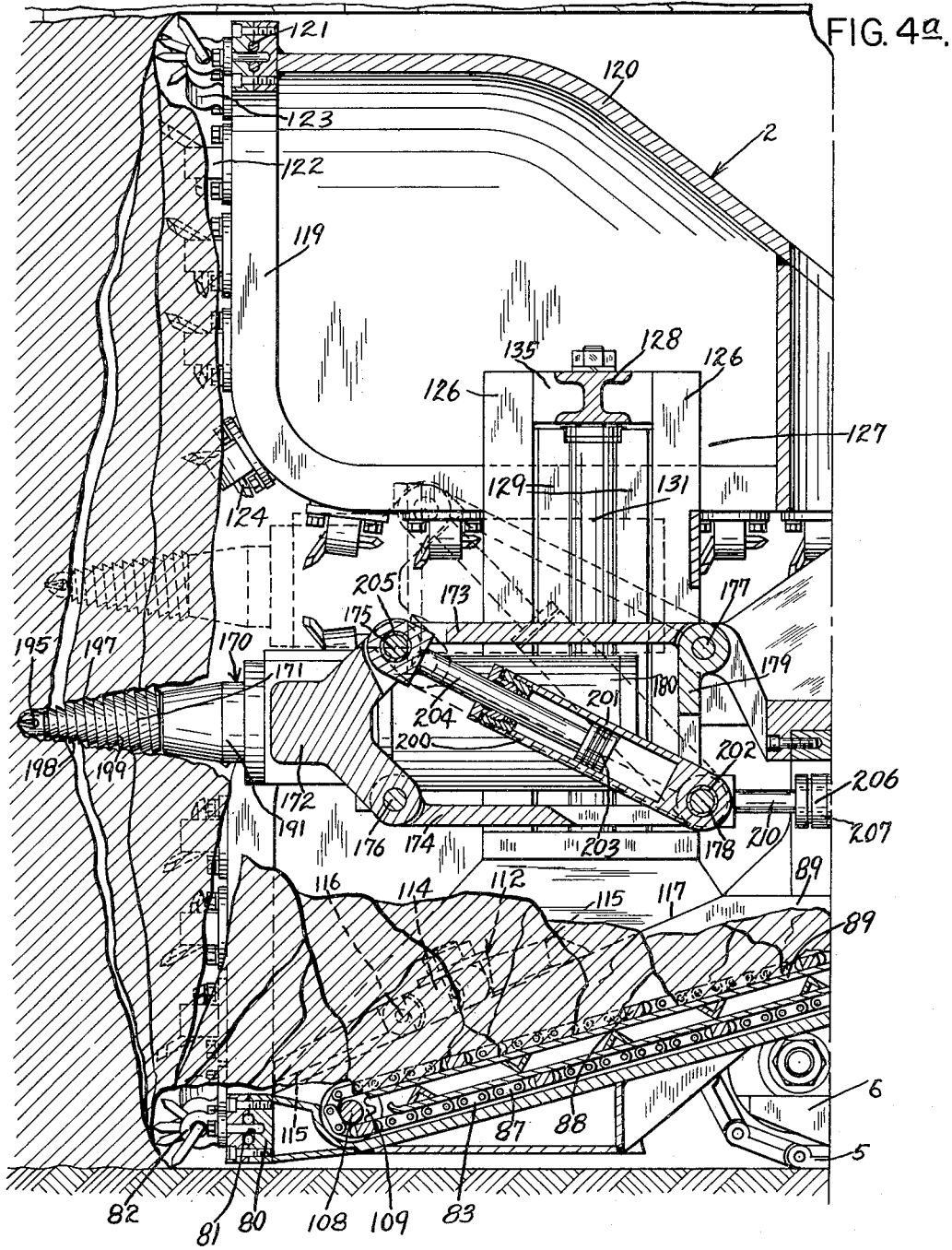

The forward portion of the tiltable frame or superstructure 66 carries a relatively wide U-shaped bar or guide frame 80 extending transversely substantially the entire width of the apparatus and provided with a horizontal transverse bottom portion and parallel vertical side portions, these portions having a guideway 81 along which an endless loop cutter chain 82 is guided for orbital circulation. Extending forwardly and downwardly within the open center of the U-bar is an endless flight conveyor 83 of the conveyor means with the front receiving portion of the conveyor disposed at the bottom of the U-bar rearwardly of but close to the transverse bottom run of the cutter chain 82 near the floor level, as shown in FIG. 4a. The tiltable frame 66 has a rearwardly projecting rear horizontal frame portion 84 and the rear discharge portion 85 of the conveyor is guided on this rearward frame portion and is provided with conventional rear takeup devices 86 for adjusting the tension of the conveyor chains 87. Transverse flights 88, connected between the conveyor side chains, are movable along the upper surface of a top plate 89 of a trough-like frame structure 90, in a well known manner (see also FIGS. 4b and 4c).

Figure 6A:
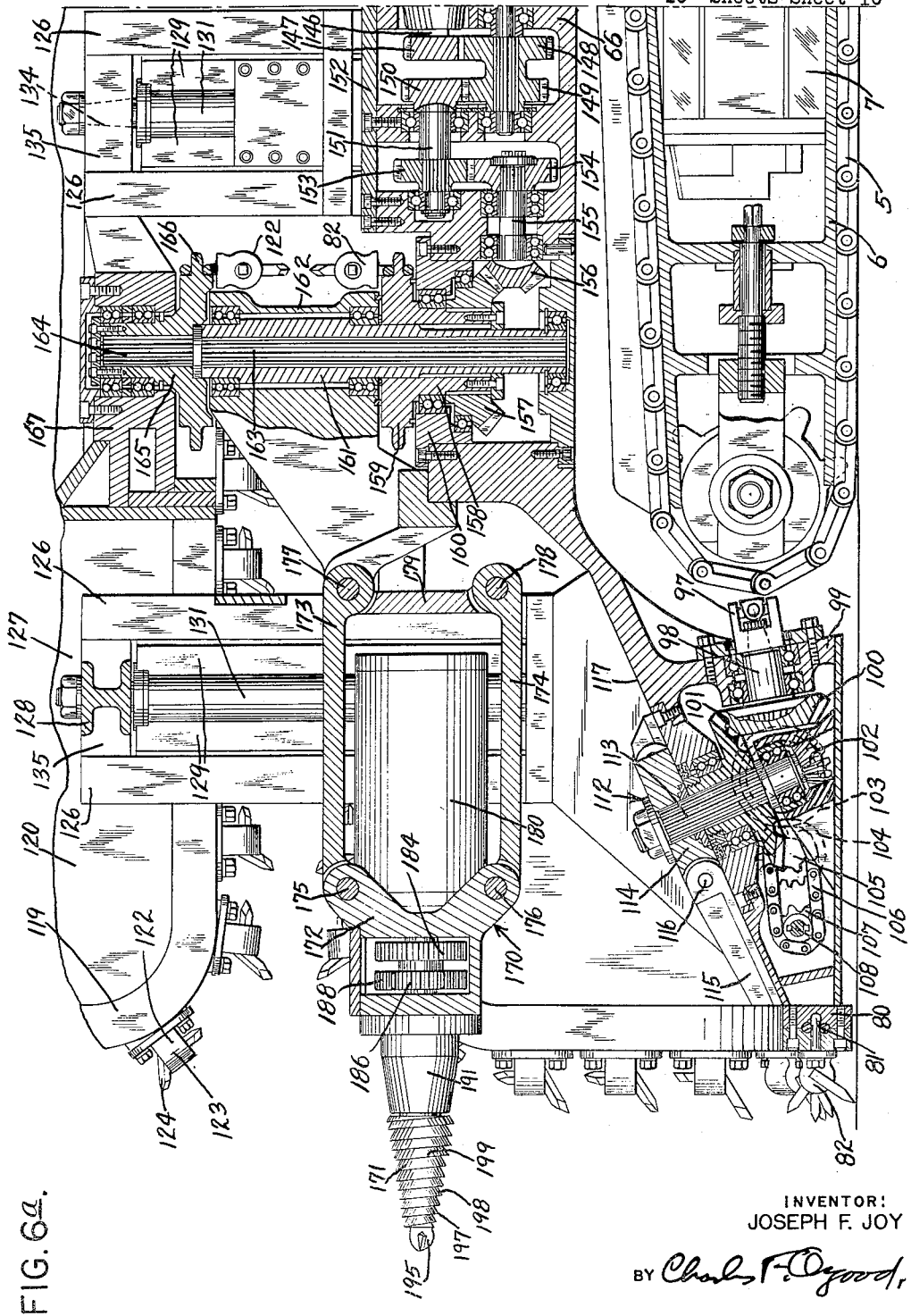

Again referring to the conveyor driving means it will be noted that secured to the shaft 50 (FIG. 9) is a spur gear 92 meshing with and driving a spur gear 93 (FIG. 4b) secured to a parallel longitudinally extending shaft 94 suitably journaled within bearings supported by the base frame. The front end of this shaft is connected by a universal joint 95 to a telescopic shaft connection 96 extending forwardly and downwardly beneath the tiltable frame 66. The front end of this shaft connection is connected by a universal joint 97 (FIG. 6a) to a forwardly and downwardly inclined shaft 98 suitably journaled in bearings supported within a depending bearing bracket 99 integral with a forward nose portion of the tiltable frame 66. Secured to the shaft 98 is a bevel gear 100 meshing with and driving a bevel gear 101 arranged on an upwardly extending, forwardly inclined axis and suitably journaled within the tiltable frame. Meshing with and driven by the bevel gear 101 is a bevel gear 102 which drives a spur gear 103 in turn meshing with and driving a spur gear 104. The gear 104 drives a chain sprocket 105 connected by an endless drive chain 106 to a chain sprocket 107 fixed to a transverse shaft 108 (see also FIG. 4a). This shaft is suitably journaled with the forward portion of the tiltable frame 66 just rearwardly of the U-bar 80, as shown in FIGURES 4a and 6a. Secured to this cross shaft are chain sprockets 109 which engage and drive the side chains 87 of the conveyor.

Arranged at opposite sides of the forward receiving portion of the conveyor are rotary gatherers each generally designated 112 and these rotary gatherers may be driven in various manners. As illustrated the driving means for these rotary gatherers comprises upwardly and forwardly inclined shafts 113 to which the hubs 114 of the gatherers are secured (FIG. 6a). Secured to the cross shaft 108 of the conveyor drive at the opposite side of the tiltable frame from the chain sprocket 107 is a chain sprocket of a similar chain and gear drive which drives a bevel gear (not shown) similar to the bevel gear 101 and to which the adjacent shaft 113 is secured. It will thus be seen that similar but reversely disposed driving connections are arranged at opposite sides of the tiltable frame for concurrently driving the rotary gatherers in relatively opposite directions. Each of the rotary gatherers includes fingerlike flights or radial arms 115 pivotally connected at 116 to the hubs 114 so that the flights or arms may tilt to upright planes to permit the arms to ride over any underlying obstruction and these arms move the material to be gathered over an upwardly and rearwardly inclined top surface 117 of the tiltable frame and discharge the material laterally onto the conveyor. From the foregoing it will be evident that by the provision of the universal, telescopic shaft connection 95, 96, 97, the conveyor and rotary gatherers may be driven by the motor 7 on the base irrespective of the tilted position of the tiltable frame 66.

Cooperating with the bottom U-bar 80 of the core cutting and dislodging head is an upper inverted U-bar 119 having a closed upper frame 120 and desirably of the same lateral and vertical dimensions and shape as the lower U-bar and providing a horizontal upper transverse portion and parallel vertical side portions having a guideway 121 thereabout along which an endless loop cutter chain 122 is guided for orbital circulation with the top run of the cutter chain disposed at the roof level. The loop cutters 82 and 122 may assume various forms but are herein similar to that disclosed in my copending application Serial No. 368,084 filed July 15, 1953, now Patent No. 2,733,906, owned by the same assignee as the present invention. The chains are of the cable type and certain links have lateral lugs 123 secured thereto which carry cutter bits 124, the latter being "laced" or staggered in a conventional manner so that the chains may cut kerfs in the mine vein with clearance sufficient to permit entry of the adjacent forward portions of the U-bar into the kerfs as the apparatus is advanced.

Figure 3:
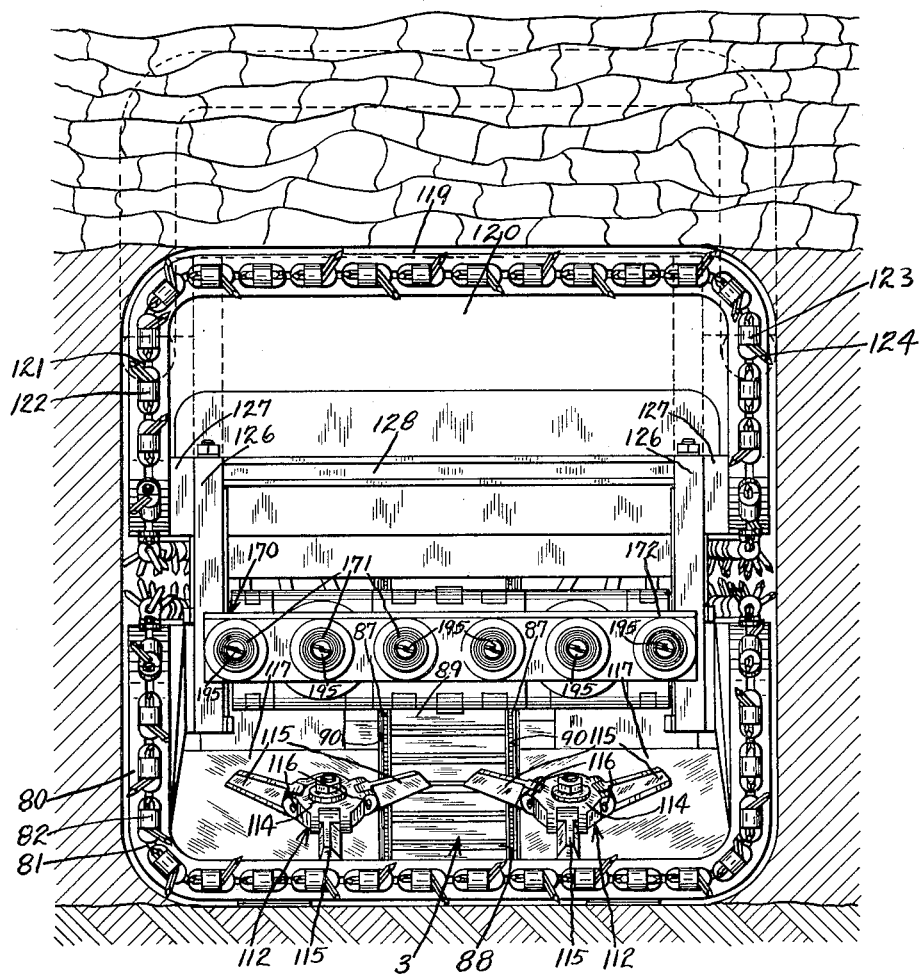
FIG. 3 is a front and elevational view of the apparatus shown in FIGS. 1 and 2.

The upper U-bar is adjustable in a vertical direction relative to the lower U-bar so that mine veins of varying heights may be cut and dislodged. The means for adjusting and guiding the upper U-bars, as illustrated, comprise pairs of front and rear upright guide members 126 secured to the vertical side portions 127 of the upper U-bar and connected in rigid relation by an upper cross bar 128 (FIGS. 3, 4a and 6a). These guide members slidingly engage vertical guides 129 secured to the sides of the tiltable frame 66. As shown more clearly in FIG. 8, vertical hydraulic cylinders 131 are secured within the guides 129 and respectively contain reciprocable pistons 132 having the upstanding piston rods 133 fixed at 134 to the upper portions 135 of the guide members 126. Thus when hydraulic pressure is suitably supplied to the cylinders 131 the upper U-bar may be raised and lowered as desired, and by trapping liquid within the cylinders, the upper U-bar may be firmly held in adjusted position.

Now referring to the driving means for the loop cutter chains 82 and 122, it will be noted that these chains travel along the guideways at the forward face of the horizontal and vertical portions of the U-bars, and the bar guideways along the adjacent horizontal portions of the bars are inclined rearwardly and inwardly at 136 (FIG. 5b) so that the chains may engage and pass around drive sprockets, to be later described, arranged on vertical parallel axes spaced equidistantly from and at the opposite sides of the central longitudinal vertical plane of the apparatus. The horizontal runs of the cutter chains extending between these drive sprockets pass around centrally located idler sprockets 137 (FIG. 4b), and these idler sprockets are journaled to turn about vertical axes and are each mounted on adjustable supports 138 slidingly engaging horizontal longitudinally extending guideways 139 of superimposed horizontal guide members 140 carried respectively by the upper and lower U-bars. Each sliding support 138 has an adjusting screw 141 provided with a rearward turning portion 142 and threadedly engaging nut portions 143 on the sliding supports 138 for adjusting the latter along the guideways. Thus the idler sprockets may be independently adjusted respectively to vary the tension of the loop cutter chains.

The driving means for the loop cutter chains of the upper and lower U-bars comprises a pair of horizontal motors 145 mounted at opposite sides of the tiltable frame or superstructure 66 rearwardly of the rear upright guides 126 (FIGS. 1 and 2) and these motors have their power shafts 146 (FIG. 6a) extending in parallelism longitudinally of the apparatus. Secured to the front ends of the motor shafts are spur pinions 147 meshing with spur gears 148, the latter having rotatable therewith spur gears 149 meshing with and driving spur gears 150 secured to longitudinally extending horizontal shafts 151. These shafts are suitably guided within gear housings 152 arranged at opposite sides of the tiltable frame 66 and have keyed thereto spur gears 153 meshing with spur gears 154 in turn keyed to longitudinally extending horizontal shafts 155 likewise suitably journaled within bearings supported within the gear housings. Integral with these shafts 155 are bevel pinions 156 meshing with and driving bevel gears 157, the latter rotating about vertical axes and having their hubs keyed to the hubs 158 of chain sprockets 159. These chain sprockets are suitably journaled within bearings supported by bearing supports 160 mounted at the forward portions of the gear housings 152 and are arranged to engage the lower loop cutter chain 82 at laterally spaced points. Keyed within the hubs respectively of the chain sprockets 159 are vertical tubular shafts 161 suitably journaled in bearings supported by bearing supports 162 mounted at the tops of the forward portions of the gear housings 152. Telescoping axially within and splined to these tubular shafts 161 are vertical shafts 163 keyed at their upper portions at 164 to the hubs 165 of chain sprockets 166. The sprocket-hubs are suitably journaled within bearings supported within upper bearing supports 167 secured to the upper U-bar and are arranged to engage the upper loop cutter chain at laterally spaced points for driving the chain. Thus, due to the telescopic shafts 161, 163, the upper loop cutter chain may be driven irrespective of the vertically adjusted position of the upper U-bar.

The upper and lower loop cutter chains cooperate to cut out a core of mineral from a solid mine vein as the apparatus is adjusted and associated with the upper and lower U-bars within the confines thereof is a vertically adjustable drilling and wedging mechanism generally designated 170 for engaging the core of mineral to dislodge the latter. This drilling and wedging mechanism comprises a transverse row of parallel drilling and wedging devices 171 mounted on a transverse frame 172 extending horizontally between the vertical sides of the U-bars, as shown in FIGS. 3, 4a, 5a, and 6a. This transverse frame is supported by parallel upper and lower arms or links 173 and 174, and these links are pivotally connected at their front ends at 175 and 176 to the transverse frame 172 and are pivotally mounted at their rear ends at 177 and 178 on a rear support 179, the latter desirably arranged parallel with the transverse frame 172. Thus the parallel arms or links have their pivots arranged at the four corners of a rectangle in such manner that the links cooperate to provide a "parallel motion" mounting for the drilling and wedging devices.

In this instance there are six of the drilling and wedging devices 171 shown and these are driven, as shown in FIG. 5a, by motors 180, one motor desirably driving three of the drilling and wedging devices. These motors are desirably arranged between the center and side links of the parallel link mounting and each has keyed to its power shaft 181 a spur pinion 182 meshing at its opposite sides with spur gears 183 and 184, the latter having rotating therewith spur gears 185 and 186 respectively, the latter meshing at their opposite sides with three spur gears 187, 188, and 189. These latter gears are keyed to parallel longitudinally extending shafts 190 suitably journaled at their rear ends in bearings carried by the transverse frame 172 and at their forward portions within bearings supported by tubular bearing supports 191 detachably secured to the front side of the transverse frame 172. Keyed to the shafts 190 are aligned shafts 192 suitably journaled within bearings supported within the bearing supports 191 and threadedly secured, at 193, to wedge members 194 of circular cross section and tapering forwardly and inwardly toward front drill bits 195, the latter being threadedly attached at 196 to the front portions of the wedge members in the manner shown. These wedge members are externally threaded at 197 with threads of a modified buttress type having wide, rearwardly facing, tapering wedgelike outer surfaces 198 and spiral leading edges 199. The wide tapering thread surfaces 198 diverge oppositely to the direction of taper of the wedge members, as shown. The drill bits form entering or pilot holes in the core of mineral as the apparatus is advanced and the spiral threads screw into the mineral with the wide wedge-like surfaces 198 applying outward dislodging forces to the mineral so that large fragments or lumps are broken off and thrust rearwardly as the rotating wedge members are advanced.

The drilling and wedging devices may be elevated and tilted in vertical planes in the following manner: As shown in FIG. 4a, a hydraulic jack 200 is arranged diagonally between the opposed pivots of the upper and lower, centrally located, links of the "parallel motion" mounting and comprises a cylinder 201 pivotally mounted at 202 at its rearward end and containing a reciprocable piston 203 having its piston rod 204 pivotally connected at its front end at 205 to the transverse frame 172. The cylinder and piston rod pivots are aligned with the adjacent link pivots, as shown. When hydraulic pressure is properly supplied to the jack cylinder the links are swung upwardly about their pivots to elevate the drilling and wedging devices and the "parallel motion" mounting provided by the links serves to maintain the drilling and wedging devices in horizontal position. The tilting means for the drilling and wedging devices comprises a pair of longitudinally extending parallel hydraulic jacks 206 spaced equidistantly at opposite sides of the jack 200 and comprising hydraulic cylinders 207 (FIG. 4b) pivotally mounted at 208 at their rear ends and respectively containing reciprocable pistons 209 having their forwardly extending piston rods 210 pivotally connected to the transverse frame 172. By properly supplying hydraulic pressure to the jack cylinders 207 the link and frame support structure for the drilling and wedging devices may be tilted about the rear pivots 177 for the upper links 173. By trapping liquid in the cylinders 201 and 207 the drilling and wedging devices may be firmly held in adjusted position.

In the modified embodiment shown in FIGS. 10 and 11 the mining and loading apparatus is designed for use in mines having low headroom and the upper inverted U-bar is omitted and in lieu thereof is a horizontal plane cutter bar 212 having an endless cutter chain 213 guided for orbital circulation about its margin. The upper plane cutter bar extends the full width of the bottom U-bar and the cutter chain is driven by the motors 145 through the upper chain sprockets 166 which similarly engage and drive the cutter chain at laterally spaced points. The upper plane cutter bar is guided for vertical adjustment and is adjusted vertically in the same manner as the upper U-bar of the preferred embodiment above described. The upper cutter chain 213 cuts a plane kerf in the mineral of a solid mine vein at the roof level as the apparatus is advanced and may be adjusted to cut at the roof level in mines having mineral veins of varying heights. The lower loop cutter cuts a U-shaped kerf in the mineral of a mine vein and the upper plane cutter cooperates with the U-cutter to form a core of mineral which may be dislodged by the drilling and dislodging mechanism 170. In the modification shown in FIGURE 15 the upper kerf cutter is omitted and the drilling and dislodging mechanism is tilted upwardly to operate at the roof level without the aid of an upper cutter, thus providing an apparatus which is adapted to use in mines having very low headroom.

Now referring to the hydraulic fluid system shown diagrammatically in FIGURE 16, it will be observed that the dual capacity pump 44 has the suction sides of its large and small sections 45 and 46 respectively connected by conduits 215 and 216 to a liquid tank 217 suitably mounted on the base. The discharge side of the large capacity pump section 45 is connected by a conduit 218 to the pressure passage of a valve box 219 of a conventional control valve mechanism 220. The discharge passage of the valve box 219 is connected by a conduit 221 back to the tank. The discharge side of the small pump section 46 is connected by a conduit 222 to the pressure passage of a valve box 223 of a conventional control valve mechanism 224 and the discharge passage of the valve box 223 is connected by a conduit 225 to the return conduit 221. The valve box 219 has parallel bores for respectively receiving control valves 226, 227, 228 and 229 while the valve box 223 has parallel bores for respectively receiving control valves 230 and 231. The bore containing the valve 226 is connected by a conduit 232 to the single acting jacks 67 for the tiltable frame 66 which carries the core cutting and dislodging head. The bore containing the valve 227 is connected by conduits 233 and 234 to the opposite ends of the double acting wedge lifting jack 200 while the bore containing the valve 228 is connected by conduits 235 and 236 to the opposite ends of the double acting wedge tilting jack 206. The bore containing the valve 229 is connected by conduits 237 and 238 to a conventional equalizer valve device or flow divider 229 from which conduits 240, 241, 242 and 243 lead to the elevating jack cylinders 131 for the upper cutter. The bore containing the valve 230 is connected by a conduit 244 to the actuator cylinder 62 for the conveyor clutch 47, while the bore containing the valve 231 is connected by conduits 245 and 246 to the actuating cylinders 37 for the "spot" brakes which control drive of the crawler treads. Four radially disposed plunger valves 247, 248, 249 and 250 have a common central actuator 251 under manual control and these plunger valves are receivable in cylinders 252, 253, 254 and 255 respectively, and these cylinders are connected by branch conduits 256, 257, 258 and 259 respectively to a pressure conduit 260 leading to the pressure conduit 222 of the small pump section 46, and branch discharge conduits 261, 262, 263 and 264 lead from these plunger valve cylinders to a return conduit 265 leading back to the tank. The pressure conduit 260 has a conventional pressure relief valve 266 connected to the return conduit 265, and the valve boxes 219 and 223 have conventional relief valve mechanisms, as is well known to those skilled in the art. By properly operating the several plunger valves the reverse clutch 13 and the high and low speed clutch 23 may be actuated as desired thereby to control the speed and direction of drive of the base crawler treads.

The general mode of operation of the improved mining and loading apparatus is as follows: The apparatus may be trammed about the mine by the crawler treads 5 of the crawler base and by varying the relative speeds of the treads steering of the apparatus may be effected. During tramming the core cutting and dislodging head 2 is tilted upwardly and held in tilted position by the hydraulic jacks 67, with the lower portion of the bottom U-cutter raised above the floor level, and when the working place is reached the jacks may be operated to lower the tiltable frame 66 to bring the core cutting and dislodging head down to the floor level, as shown diagrammatically in FIG. 12. The loop cutter chains 82 and 122 of the preferred embodiment and the chain of the upper plane cutter of the modified embodiment may then be driven by the motors 145 and the crawler treads 5 may then be operated to feed the apparatus bodily forwardly at a relatively slow speed to effect sumping of the cutters into the solid mine vein to form a core of mineral substantially free at its margin. As sumping of the cutters takes place the drilling and wedging devices 171 are fed into the core of mineral to effect dislodgment of the core in relatively large fragments or lumps from the face, and the dislodged mineral is thrust from the face and falls rearwardly downwardly within the lower U-bar. The rotary gatherers 112 gather the dislodged mineral within the bottom U-bar and move the mineral so gathered rearwardly, upwardly and inwardly onto the forward receiving portion of the conveyor 85 and the latter conveys the material thereon upwardly and rearwardly to discharge at the rear end of the apparatus. The core cutting and dislodging head may be tilted during the mining operation by the hydraulic jacks 67 to enable the head to follow an uneven floor or rolling bottom and the elevating jacks 131 may be operated to raise the upper cutter to accommodate the head to mine veins of varying heights. By operating the jacks 200 and 206 for the drilling and wedging devices 171 the latter may be elevated and tilted so as to enable engagement to the core of mineral at different elevations to suit different mining conditions. By reversing the drive for the crawler treads the apparatus may be rapidly retracted from the face.

As a result of this invention an improved mining and loading apparatus is provided whereby the mineral of a solid mine vein may be rapidly and efficiently dislodged and loaded out without the need for separate cutting, drilling and blasting operations. The improved U-bar cutter, its cooperating top cutter and the associated dislodging wedge devices enable removal of the core from the face in relatively large fragments or lumps, and the gathering and conveying means enable rapid removal of the dislodged mineral from its dislodged position at the face. By the provision of the adjusting means for the upper and lower cutters and the dislodging mechanism the apparatus may readily be adjusted to accommodate itself to varying mining conditions such as are encountered in mines having varying height headroom and an uneven or rolling floor or bottom. These and other advantages of the invention will be clearly apparent to those skilled in the art.

While there are in this application specifically described two forms and a modification which the invention may assume in practice, it will be understood that these forms and this modification of the same are shown for purposes of illustration and that the invention may be further modified and embodied in various other forms without departing from its spirit or the scope of the appended claims.

What I claim as new and desire to secure by Letters Patent is:

1. In a mining apparatus, a support movable over the floor of a mine passageway, a core cutting head on said support having orbitally moving core cutting means for simultaneously cutting kerfs along the roof and floor levels and at the sides of the mine passageway in a face of a mine vein to form a core of mineral substantially free at its margin, a normally horizontal dislodging device mounted on said support within the confines of said head for engaging the core of mineral to apply powerful dislodging pressures to the core from within the latter in directions toward the kerfs completely to dislodge the core from the solid, and means for adjusting the elevation of said dislodging device with respect to said core cutting means to vary its loci of dislodging engagement with the core, said adjusting means for said dislodging device including means for tilting said device with respect to the horizontal to vary its angle of attack with respect to the mineral-core.

2. A mining apparatus comprising, in combination, a mobile base, a frame structure mounted on said base for adjustment in vertical planes relative thereto, a core cutting and dislodging head carried at the forward portion of said frame structure, said head comprising relative adjustable orbitally moving upper and lower cutters simultaneously cooperating to cut out cores of mineral of varying heights and of uniform depth from a solid mine vein, a normally horizontal dislodging device disposed within the confines of said cutters and engaging the core for applying powerful internal dislodging pressures to the core for dislodging the latter from the solid, means for adjusting the elevation of said dislodging device relative to said cutters to vary its loci of engagement with the mineral-core, and means for tilting said dislodging device relative to the horizontal irrespective of the elevated position of the device.

3. In combination, a core cutting head for cutting out a core of mineral extending between the roof and floor of a mine and having an open center, a horizontal dislodging wedge device extending within the open center of said head engageable with the core of mineral to apply powerful internal dislodging pressures to the core to dislodge the latter from the solid, a parallel motion link structure for supporting said wedge device and pivotally mounted to swing in a vertical direction, means for swinging said link structure in a vertical direction to vary the elevation of the loci of engagement of said wedge device with the core of mineral while maintaining said wedge device horizontal.

4. A combination as set forth in claim 3 wherein means is provided for tilting said link structure to effect tilting of said wedge device with respect to the horizontal to vary its angle of attack with respect to the mineral core.

5. In combination, a mobile base, a tiltable frame structure mounted on said base, core cutting mechanism carried at the front end of said frame structure comprising a bottom U-bar and an inverted top U-bar, said U-bars providing opposed U-shaped guideways open at their adjacent sides and having endless loop cutter chains guided for orbital circulation therealong and the forward effective cutting portions of said chains of said top and bottom bars disposed in a common transverse vertical zone so that said cutter chains cooperate to cut kerfs of uniform depth in the mine vein to form a core of mineral of uniform projection from a solid mine vein, means for adjusting the elevation of said top U-bar relative to said bottom U-bar to vary the vertical extent of the core, a dislodging wedge mechanism arranged within the confines of said U-bars for engaging the core of mineral to apply powerful internal dislodging pressures to the core to dislodge the latter from the solid, the dislodged mineral falling by gravity into the open space within said bottom U-bar, means for adjusting the elevation of said wedge mechanism relative to said U-bars to vary the loci of engagement of said wedge mechanism with the mineral-core irrespective of the vertical extent of the latter, said wedge mechanism being normally horizontal during adjustment thereof, and means for tilting said wedge mechanism with respect to the horizontal to vary its angle of attack with respect to the mineral-core.

References Cited in the file of this patent

UNITED STATES PATENTS

| | | |
|---|---|---|
| 1,116,357 | Morgan | Nov. 3, 1914 |
| 1,184,358 | Kuhn et al. | May 23, 1916 |
| 1,273,869 | Joy | July 30, 1918 |
| 1,445,085 | Joy | Feb. 13, 1923 |
| 1,507,421 | Peale | Sept. 2, 1924 |
| 1,567,329 | Peale | Dec. 29, 1925 |
| 1,726,963 | McKinlay | Sept. 3, 1929 |
| 2,083,834 | Galuppo et al. | June 15, 1937 |
| 2,086,573 | Osgood | July 13, 1937 |
| 2,189,670 | Lewis | Feb. 6, 1940 |
| 2,562,841 | Compton | July 31, 1951 |
| 2,630,308 | Moon | Mar. 3, 1953 |
| 2,694,562 | Snyder et al. | Nov. 16, 1954 |
| 2,705,624 | Robbins | Apr. 5, 1955 |
| 2,739,798 | Von Stroh | Mar. 27, 1956 |

FOREIGN PATENTS

| | | |
|---|---|---|
| 272,309 | Great Britain | June 16, 1927 |
| 290,349 | Great Britain | May 10, 1928 |
| 631,099 | Great Britain | Oct. 27, 1949 |